United States Patent [19]

Bibbens

[11] 3,851,999

[45] Dec. 3, 1974

[54] SEALING ASSEMBLY

[76] Inventor: William H. Bibbens, 16500 N. Park Dr., Southfield, Mich. 48075

[22] Filed: Dec. 5, 1972

[21] Appl. No.: 312,408

[52] U.S. Cl. .................. 418/142, 418/61, 418/122
[51] Int. Cl. ........................................... F01c 19/00
[58] Field of Search ............ 418/142, 61, 122, 104, 418/111; 277/81

[56] References Cited
UNITED STATES PATENTS

| | | | |
|---|---|---|---|
| 2,547,374 | 4/1951 | Carideo | 418/104 |
| 2,880,045 | 3/1959 | Wankel | 418/142 |
| 3,120,921 | 2/1964 | Hovorka | 418/111 |
| 3,134,600 | 5/1964 | Fisch | 418/142 |
| 3,139,233 | 6/1964 | Simonsen | 418/142 |
| 3,176,910 | 4/1965 | Bentele | 418/61 |
| 3,312,202 | 4/1967 | Udelman | 418/111 |

*Primary Examiner*—C. J. Husar
*Attorney, Agent, or Firm*—Reising, Ethington & Perry

[57] ABSTRACT

A sealing assembly particularly suitable for use with rotary devices such as eccentric rotor engines, including the type referred to as "Wankel engines," as well as other types of rotary engines, and rotary pumps, compressors and the like. The sealing assembly is constructed in such a manner that the friction forces generated by relative movement of the two surfaces are harnessed and utilized to increase the resistance to movement of fluid from a high-pressure zone to a low-pressure zone. The friction forces act on force-transmitting means which produce reaction components of force in two directions to simultaneously urge a sealing member toward sealing engagement with two angularly disposed surfaces and resist any forces tending to urge the sealing member away from the two surfaces. The sealing assembly is thus automatically compensating for wear and for friction and other forces tending to urge the sealing member away from the two sealing surfaces. A groove in the end face of one of two relatively moveable members receives a sealing strip which has a portion projecting from the groove for engagement with a surface of the second member. Interengageable force-transmitting means on the sealing strip and first member are operable in response to friction forces between the surface of the second member and the sealing strip to simultaneously urge the sealing strip toward sealing engagement with one side wall of the groove and the surface of the second member to simultaneously resist forces tending to separate the sealing strip from the surface of the second member and from the side wall of the groove, which would provide a leakage path for gases from a high-pressure zone to a low-pressure zone located on opposite sides of the sealing strip.

36 Claims, 31 Drawing Figures

SEALING ASSEMBLY

This invention relates generally to the containment of variable pressures within variable volume, movable zones, and is particularly concerned with the provision of a sealing assembly to controllably provide resistance to the flow of gas from a zone of high pressure to a zone of low pressure, the zones being defined between relatively moving members such that sealing pressure must be exerted on two angularly disposed surfaces, each located on one of the relatively moving members.

When a zone of high pressure and a zone of low pressure are defined by two relatively moving parts, the problem of providing a seal separating the high and low pressure zones is aggravated by the tendency of friction and pressure to cause the seal to unseat from its sealing surfaces and provide a leakage path. This is particularly a problem where a seal must be provided between two surfaces rotatable relative to each other in order to maintain separation of the high and low pressure zones. The seal, in the latter case, must block two possible leakage paths at surfaces angularly disposed with respect to each other and each located on different ones of the movable members. The seal must have a sliding contact with one of the surfaces, and friction and pressure forces will at some time tend to unseat the seal from both surfaces. It is necessary for the seal to be movably mounted on one of the members in order to compensate for wear on the seal, particularly the portion of the seal that is in sliding contact with one surface. In rotary devices, such as pumps and rotary engines, the seal must have a long life, even though subject to extensive wear. The problem is particularly acute in eccentric rotor engines.

Eccentric rotor engines are rotary engines of the type in which motion is imparted to a shaft by a rotor that is eccentric to the shaft. A leading example of eccentric rotor engines is the type commonly referred to as the "Wankel engine" as disclosed, for example, in U.S. Pat. No. 2,988,065. The Wankel engine includes a three-cornered rotor which is rotatable inside a cavity of a housing, or outer body. The rotor is generally in the shape of a triangle having convex sides and rotates within the cavity about an eccentric axis. The corners, or apex portions, of the rotor slide along an inner side surface of the cavity, which surface has a shape that is generally referred to as being epitrochoidal or trochoidal, to conform to the path of the apex portions of the rotor. The end faces of the rotor are in sliding, rotatable engagement with the inner surfaces of the end walls of the cavity. The cavity has intake and exhaust ports. As the rotor rotates within the cavity, the side faces of the rotor cooperate with the walls of the cavity to define intake, compression, and exhaust chambers, so that during rotation of the rotor, the four phases of intake, compression, expansion, and exhaust are provided during each revolution of the rotor.

Effective seals must be provided between the apex portions of the rotor and the inner side surfaces of the cavity, and between the end faces of the rotor and the opposed inner surfaces of the end wall of the cavity. The seals at the apex portions are referred to generally, and herein, as "apex seals," while the seals on the end faces of the rotor are referred to generally, and herein, as "side seals." The pressures in the working chambers of the engine are confined by the side seals and the apex seals. The working chambers of the engine define high-pressure zones, at least during a portion of each revolution, and the side seals must prevent the escape of fluid from the high-pressure zone to the low-pressure zone on the opposite side of the side seal from the working chamber. The side seals are generally in the form of sealing strips received in grooves in the end faces of the rotor, so that an outer portion of each side seal projects from the groove and slidably engages the inner surface of the end wall of the trochoidal cavity during rotation of the rotor. The side seal must seal against two surfaces, namely, one side wall of the groove in which the seal is received, and the inner surface of the end wall of the cavity with which the seal has sliding contact. The sealing forces on the two sealing surfaces must be controlled within reasonable limits in order to maintain adequate engine performance. Moreover, the sealing forces must be controlled in such a manner as to compensate for wear of the side seal so that the sealing forces remain uniform during the operation of the engine.

During operation of devices of the type referred to in the preceding paragraph, the seal is subjected to a variety of forces tending to unseat the side seal strip in two directions, both axially and transversely, thereby tending to provide two leak paths. The seal is subjected to friction forces on its outer portion due to its sliding engagement with the end wall of the cavity, and the direction of the frictional forces at each point along the length of the side seal strip changes as the point moves about the axis of rotation of the rotor. As pointed out above, the seal must seat partly against one side wall of the groove in which it is received in order to prevent leakage of fluid from the high pressure zone through the groove. This side wall is generally preferably the side wall of the groove on the opposite side of the seal from the working chamber, or high-pressure zone, so that the high pressure tends to urge the seal toward its seat. This side wall may be referred to as the "sealing wall" for convenience, and this term will be used hereinafter to refer to the wall of the groove against which the seal must exert sealing pressure.

As pointed out above, the direction of the frictional forces at each point along the length of the outer portion of the side seal changes as the point moves in its non-circular path against the surface of the end wall of the cavity. Consequently, at some positions along the path of movement of the point, the friction forces will be in a direction to urge the seal toward engagement with the sealing wall of the groove, while at other positions along the path of movement of the same point, the frictional forces will be in a direction tending to move the seal away from the sealing wall and thereby provide a leakage path through the groove. Hence, the problem of controlling the sealing pressure on the sealing wall particularly is aggravated by the wide variation in the magnitude and direction of the forces acting on the seal during operation of the engine.

Another problem in maintaining a controlled sealing pressure in rotary devices such as Wankel engines is that different portions of the seal are subjected to different rates of wear. The side seals are of arcuate configuration, and the forces acting on the arcuate seal tend to cause the seal to tilt in the groove about an axis parallel to a chord connecting the ends of the arcuate sealing strip which in turn may cause the ends of the sealing strip to retract into the groove even though the central portion of the sealing strip remains in contact with the end wall of the cavity. Furthermore, the ends of the sealing strip travel a greater distance during each revolution of the rotor than the central portion and are thus subjected to a greater amount of wear. These two factors thus tend to increase the likelihood of leakage at the ends of the side seals.

Another factor that must be taken into account in providing a seal in devices such as Wankel engines is the possible adverse effect of carbon particles and other foreign matter on the seals. Since the side seals must float in the grooves of the rotor, any buildup of carbon on the walls of the groove increases the likelihood that the side seal strip will stick in the groove and lose its sealing pressure and thereby provide a leakage path from the high pressure zone to the lower pressure zone.

Considerable effort has been directed to controlling the sealing pressure of the side seals of rotary engines, including arrangements wherein the pressures from the high pressure zones have been directed to the side seal grooves in such a manner as to urge the side seals into a sealing direction against the sealing wall of the groove and the end wall of the cavity against which the groove has slidable contact. However, it is difficult to adequately control the fluid pressure directed to the seal, and it is particularly difficult to control the pressure at different positions along the length of the arcuate seal which require different sealing pressures. Usually, a spring is seated in the groove to bias the side seal outwardly relative to the end face of the rotor toward engagement with the end wall of the cavity. It is, however, difficult to preduct how much the biasing force will vary over the life of an engine which operates over a wide range of temperatures and other operating conditions. This type of arrangement has not solved the problem of providing uniform sealing pressure along the entire length of the arcuate sealing strip.

Rotary engines have been provided wherein a pair of coaxial sealing rings are formed with intermeshed teeth having inclined surfaces. Frictional forces on the edges of the sealing rings opposite the intermeshed teeth tend to cause the rings to expand with respect to each other. Such a construction is disclosed, for example, in U.S. Pat. No. 2,547,374. However, in the engine disclosed in the latter patent, the sealing rings are caused to expand axially only. Examples of other prior art devices having expandible seals of this general type are disclosed in U.S. Pat. Nos. 902,585; 628,327; 3,120,921; 3,139,233; and 3,176,910.

Another approach to this problem has been to provide two inner and outer sets of side seals on the rotor so that leakage past the outer set of side seals from the working chambers of the engine encounters the second, inner set of side seals. This approach, however, does not solve the problem, and is expensive in requiring two sets of seals.

An object of this invention is to provide a sealing assembly for providing resistance to the movement of fluids from a high pressure zone to a low pressure zone between two relatively moving surfaces wherein the frictional forces between the relatively moving surfaces are harnessed to provide a uniform, controlled sealing pressure.

A further object is to provide a sealing assembly for containing pressures that constantly increase and decrease within given zones.

A further object is to provide a sealing assembly for providing resistance to the flow of fluid from a high pressure zone to a low pressure zone between two relatively moving members wherein force transmitting means engaged between one of the members and a sealing member produces reaction forces in response to friction forces between the two members, which reaction forces have components in two directions to simultaneously urge the sealing member toward sealing engagement with two angularly disposed surfaces and resist any forces tending to urge the sealing member away from the two surfaces.

A further object is to provide a side seal assembly for rotary devices such as Wankel engines wherein the friction forces acting on the side seals are harnessed and utilized to provide a uniform sealing pressure throughout the length of the side seal.

Still another object is to provide a side seal construction for the rotor of an eccentric rotor machine such as Wankel engines in which the frictional forces on the outer edge of the side seals are utilized to produce a positive sealing force both in a transverse direction to urge the side seal against the sealing wall of the groove in which it is seated and an axial direction to urge the side seal against the surface of the end wall of the cavity with which the seal is slidably engaged during operation of the machine.

A still further object is to provide a sealing assembly for the side seals of rotors of rotary machines, such as Wankel engines and other eccentric rotor engines, wherein interengageable force transmitting means is provided on the side seal and rotor operable in response to friction forces on the side seal to apply both transverse and axial reaction forces on the side seal to simultaneously urge the side seal transversely into sealing engagement with one side wall of the groove in which the side seal is seated and to project axially outwardly from the groove to maintain sealing engagement with the end wall of the cavity in which the rotor is received.

A further object is to provide a sealing assembly for sealing two angularly disposed surfaces located respectively on two relatively movable members wherein a sealing strip received in a groove in one of the members has an outer portion projecting from the groove into engagement with the end face of the other of the members, and interengageable force transmitting means is provided on the sealing strip in said one member operable in response to friction forces between the surface of said other member and said sealing strip to apply transverse and axial reaction forces on the sealing strip to simultaneously urge the sealing strip toward sealing engagement with one side wall of the groove and toward sealing engagement with the end face of the other member.

In carrying out the foregoing, and other objects, a sealing assembly according to the present invention includes a pair of relatively movable members having axially spaced, opposed end faces. A groove is formed in the end face of one of the members, and a sealing strip is received in the groove and has an outer portion projecting from the groove into engagement with the end face of the other member. Interengageable force transmitting means are provided on the sealing strip and the member in which it is seated, which force transmitting means is operable in response to friction forces between the surface of the other member and the sealing strip to apply transverse and axial reaction forces on the sealing strip to simultaneously urge the sealing strip toward sealing ngagement with one side wall of the groove and toward sealing engagement with the end face of the other member.

Other objects, advantages and features of the invention will become apparent from the following description taken in connection with the accompanying drawings in which:

FIG. 17 is a view similar to FIG. 16 showing another embodiment of the invention;

FIG. 18 is a view taken on lines 18—18 of FIG. 17;

FIG. 19 is a view similar to FIG. 15 showing still another form of the invention;

FIGS. 28a through 28o are sectional views taken respectively on lines 28a—28a through 28o—28o of FIG. 28;

FIG. 30 is a plan view of a side seal with the range and direction of the frictional forces illustrated on the points moving along the path diagrammatically illustrated in FIG. 29; and FIG. 31 is an end view of the side seal of FIG. 30 taken on lines 31—31 and illustrating the manner in which the frictional forces cause the ends of the sealing strip to sag relative to the central portion thereof.

Figure 1:
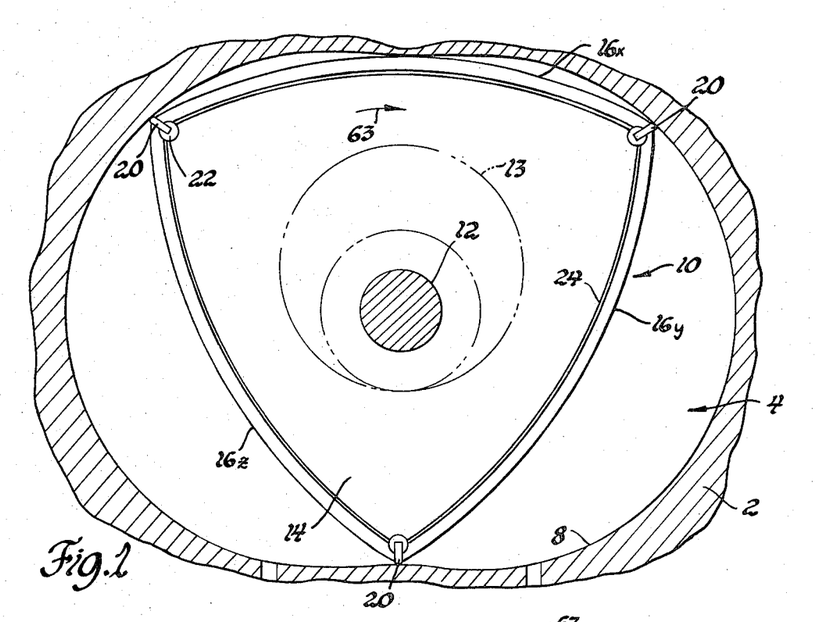
FIG. 1 is a sectional view of a rotary engine embodying the invention.
Figure 2:
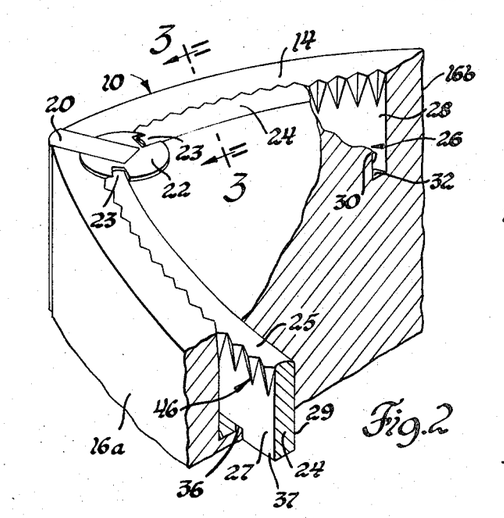
FIG. 2 is a fragmentary perspective view of one form of rotor and side seal construction for an engine of the type illustrated in FIG. 1.

In FIG. 1, reference numeral 2 designates the housing of a rotary engine. The housing 2 is formed with a cavity 4 having an inner peripheral surface 8, and end wall members 6 (FIG. 3) are secured to the housing 2 to close the opposite ends of the cavity 4. Only one end wall member 6 is visible in the drawing, it being understood that both ends of the cavity are closed by end wall members. The inner surfaces 7 (FIG. 3) of the members 6 define the end walls or faces of the cavity.

In FIG. 1, a shaft 12 is mounted coaxially with the axis of the cavity 4 of the housing 2. The end walls 7 are spaced along the axis of the cavity 4. The shaft 12 has an eccentric portion 13 having an axis spaced from and parallel with the axis of shaft 12. A triangular rotor designated collectively by reference numeral 10 is received in the cavity 4 and is mounted on the eccentric portion 13 in coaxial relationship therewith for rotation about the axis of the shaft 12.

The rotor 10 is of generally triangular configuration with end faces 14 disposed in opposed relationship with the end walls 7 (FIG. 3), and three convex side faces 16 extending between apex or corner portions, the side faces 16 being designated individually by reference numerals 16x, 16y and 16z. In the drawings, only one face of the rotor 10 is visible in the drawings, however, it should be understood that the opposite face of the illustrated rotor is substantially a mirror image of the visible face. The side faces 16x, y and z cooperate with the inner peripheral surface 8 of the cavity 4 to define the working chambers of the engine. As the rotor 10 rotates about the axis of the eccentric portion 13, which in turn rotates about the axis of shaft 12, the apex portions follow an epitrochoidal path, and the surface 8 has substantially an epitrochoidal configuration to conform to the path of the apex portions of this rotor.

Figure 3:
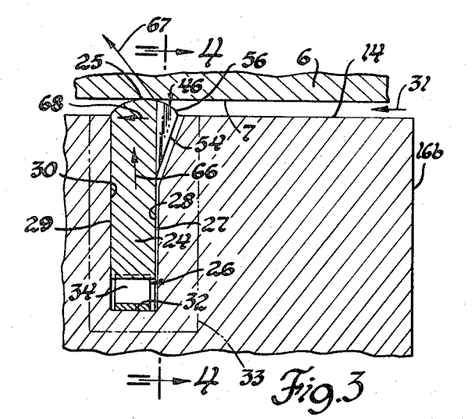
FIG. 3 is a fragmentary sectional view taken approximately on lines 3—3 of FIGS. 1.

Slidably mounted in each of the apex portions of the rotor 10 are intermediate coupling seal members 22. During operation, the coupling seal members 22 are biased outwardly to sealingly engage the end walls 7 of the cavity. Apex seals 20 are received in slots in the apex portion of the rotor and are seated in a coextensive slot in the coupling seal members 22. The apex seals 20 engage the surface 8 to define the extremities of the working chambers of the engine which are subject to differential pressures during operation of the engine. Formed in the end face 14 of the rotor 10 are side seal grooves 26, and received in each of the grooves 26 is a side seal strip 24. The ends 23 of the side seal strips 24 are slidably received in slots formed in the coupling seal members 22.

Each of the side seal strips 24 includes an outer portion 25 which projects from its respective groove 26 into engagement with the end face 7 (FIG. 3), and a pair of side surfaces 27 and 29 extend from the outer portion 25. Each of the grooves 26 has a pair of spaced side walls 28 and 30, and a bottom wall 32. The side surface 27 of the sealing strip 24 is disposed adjacent to the side wall 28 of the groove, and the side surface 29 is disposed adjacent to the side wall 30. Seated on the bottom wall of each groove 26 is a sinuous spring 34, and the sealing strip 24 is seated on the spring 34 and is biased thereby to project from the groove 26 so that the outer portion 25 is biased toward sealing engagement with the end face 7. The lower edge of the sealing strip 24 is formed with alternating notches and projections 36 and 37, respectively. The crests of spring 34 are arranged with respect to the sealing strip in such a manner that the spring engages the right hand corners 36a of the notches to bias the sealing strip toward the right in FIG. 4, for a purpose described in greater detail below.

As viewed in FIG. 3, the pressure in the working chamber acts in the direction of arrow 31 and attempts to escape between the outer portion 25 and the surface 7, and between the side surfaces of the side seal strip 24 and the side walls of the groove 26. In order to maintain an adequate sealing pressure on the side seal strip 24, it is necessary to apply a uniform axial force to the sealing strip in a direction to urge the outer portion 25 into sealing engagement with the surface 7, and at the same time to apply a transverse force to the sealing strip 24 to urge the side surface 29 into sealing engagement with the sealing wall 30 of groove 26. A problem encountered with this type of device, however, is that the friction forces on the outer portion 25 during rotation of the rotor 10 are sometimes in a direction to urge the side seal strip 24 away from the sealing wall 30 of the groove 26 and thus provide a path for leakage between the surfaces 29 and 30. This problem is illustrated diagrammatically in FIGS. 28-31.

Figure 28:
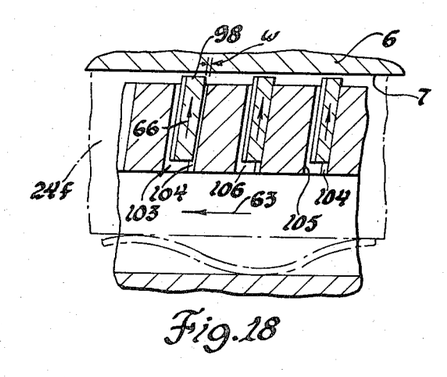
FIG. 28 is a view similar to FIG. 1 illustrating the effects of the frictional forces on the side seals as the rotor moves to the firing position.

FIG. 28 illustrates the direction of the friction forces on the side seals as the rotor moves from the phantom line position in FIG. 28 to the firing position shown in full lines in FIG. 28. The side seals 24 are designated in FIG. 28 adjacent the side surfaces 16x, y and z by reference numerals 24x, y and z, respectively. The friction force vectors are indicated by reference numerals 38 and 40 followed by the subscripts a through o on each of the side seals 24x, y and z at points designated A through O, respectively. At point A, the friction force direction is between vectors 38a and 40a and is thus in a direction to urge the sealing strip 24y toward the sealing wall 30 (FIG. 3) of the groove, that is, the wall of the groove opposite the working chamber; while at point E, the friction force as indicated by vectors 38e and 40e is in a direction to urge the seal 24y away from the sealing wall 30. The effects of the friction forces at points A through O along the side seal members 24x, y and z of FIG. 28 is illustrated diagrammatically in FIGS. 28a through 28o.

Figure 28A:
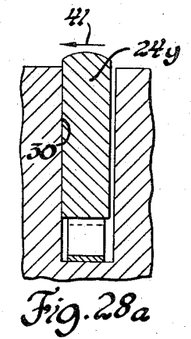
Figure 28B:
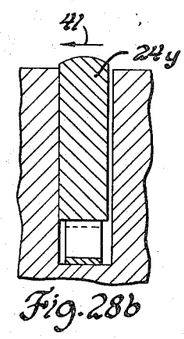
Figure 28C:
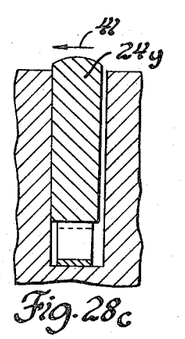
Figure 28D:
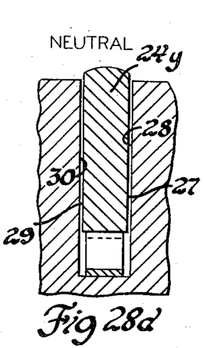
Figure 28E:
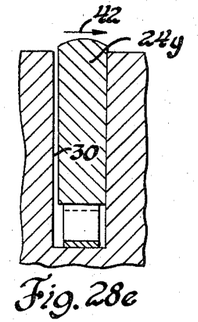

In FIGS. 28a, b and c, the friction forces have a transverse component indicated by arrows 41 in a direction to urge the sealing strip 24y toward engagement with the sealing wall 30. At point D, as illustrated in FIG. 28d, the friction force vector is substantially along the length of the seal so that there is substantially no transverse component of force acting on the seal at point D. Consequently, the sealing strip 24y, at point D, is not urged by the friction forces either toward or away from the sealing wall 30; but, insofar as the friction forces are concerned, the sealing strip at point D may float loosely in a neutral position between the side walls of the groove, and there may be clearance for leakage between the side surface 29 and the sealing wall 30 as well as between the side surface 27 and the side wall 28. At point E, as illustrated in FIG. 28e, the friction force has a transverse component indicated by arrow 42 in a direction to urge the seal 24y away from the sealing wall 30. Thus movement of the rotor from the phantom line position to the full line firing position in FIG. 28 produces friction forces on the sealing strip 24y that tend to increase the sealing pressure on the sealing wall 30 along the length of the sealing strip containing points A, B and C, but which tend to decrease the sealing pressure and hence increase the likelihood of a leakage path between the sealing strip and sealing wall 30 along the length of the sealing strip containing points D and E.

Figure 28F:
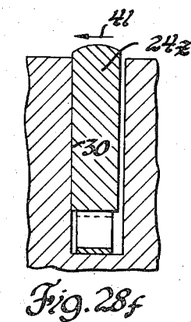
Figure 28G:
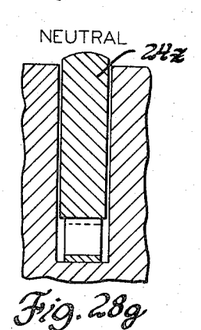
Figure 28H:
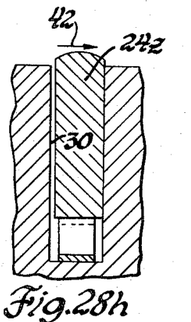
Figure 28I:
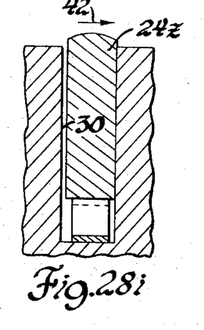
Figure 28J:
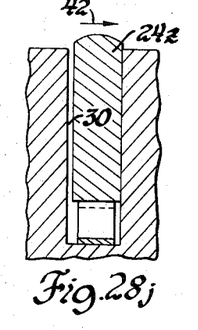
Figure 28K:
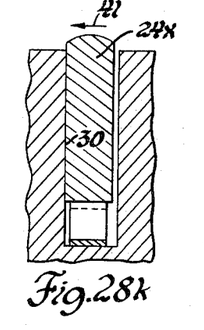
Figure 28L:
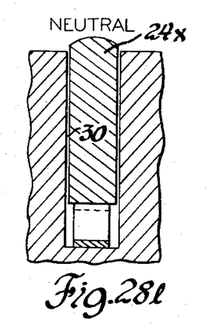

Similarly, the friction forces produced by the same movement of the rotor produces transverse components 41 urging the sealing strips 24z and 24x at points F and K, respectively, toward the sealing wall 30, as shown in FIGS. 28f and 28k, and transverse components 42 urging the sealing strips 24z and 24x away from the sealing wall 30 at points H, I, J, and O as shown in FIGS. 28h, i, j, and o, respectively. The direction of the friction forces change between points F and G, and accordingly, substantially no transverse components are produced at a point between points F and G on the sealing strip 24z, or at points L, M and N on the sealing strip 24x as shown in FIGS. 28g, l, m and n, respectively, and consequently, the same conditions exist at these points as at point D, as described above.

Figures 28M, 28N, 28O, 29, 30, 31:
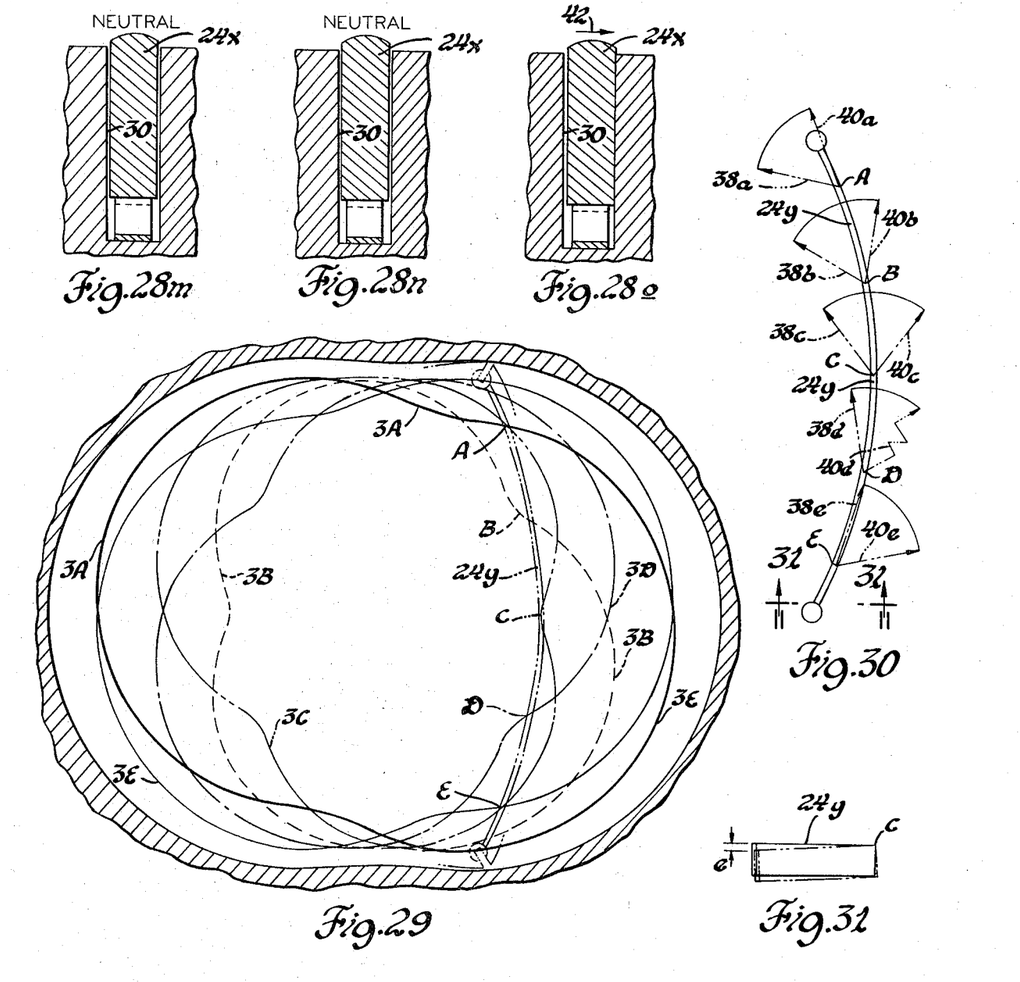
Figure 29:
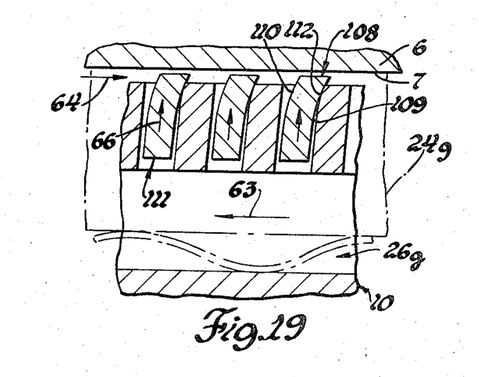
FIG. 29 is a view similar to FIG. 28 illustrating the paths of movement of various points along the length of a side seal.

FIG. 28 illustrates the friction forces at various points along the side seal strips during a portion of the movement of the rotor 10, while FIGS. 29 and 30 graphically illustrate the full range and direction of the frictional forces on the side seal strip 24y for each revolution of the rotor 10. The paths of movement of each of the points A, B, C, D, and E along the length of the sealing strip 24y are illustrated by curves 3A through E, respectively, in FIG. 29. In FIG. 30, as in FIG. 28, the full range of the friction force vectors are indicated by reference numerals 38 and 40 followed by the subscripts a through e at points A, B, C, D and E, respectively, along the length of the sealing strip. For example, during a complete revolution of the rotor, the direction of the friction forces at point B will vary from that indicated by arrow 38b to that indicated by arrow 40b. So long as the direction of the friction force is between arrow 38b and the sealing strip, it will have a transverse component in a direction to urge the sealing strip at point B toward the sealing wall 30, that is, the sealing wall on the left hand side of the sealing strip 24y in FIG. 30. Conversely, so long as the direction of the friction force is between the sealing strip and the arrow 40b, it will have a transverse component in a direction to urge the sealing strip at point B away from the sealing wall 30.

With reference to FIG. 30, the friction forces at point A vary from a direction substantially along the length of the sealing strip as indicated by arrow 40a in which case no substantial transverse component of force will be applied to the sealing strip at point A, to a direction illustrated by the arrow 38a wherein a transverse component of force is applied to the sealing strip tending to urge the sealing strip toward the sealing wall 30 of the groove. At points B, C and D, the direction of the friction forces changes from one side of the sealing strip to the other, as indicated by the fact that the arrows 38b, c and d are to the left of the sealing strip, and the arrows 40b, c and d are to the right of the sealing strip. Consequently, at points B, C and D, there are times when the sealing strip is urged away from the sealing wall 30 and there are times when the sealing strip is urged toward the sealing wall 30 during each revolution of the rotor. At point E, the direction of the friction forces varies from a direction substantially along the length of the sealing strip to directions having transverse components in a direction to urge the sealing strip out of engagement with the sealing wall 30. Thus, during each revolution of the rotor 10, the sealing pressure of the sealing strip against the sealing wall 30 is at times ineffective and is at other times augmented by the friction forces at point A. At points B, C and D, the sealing pressure of the sealing strip against the sealing wall 30 is both augmented and eliminated by the friction forces during each revolution of the rotor, while at point E, the sealing pressure is either ineffective or is eliminated by the friction forces. At any point position of the rotor, the friction forces at some point along the length of the sealing strip are in a direction causing undesirable leakage. This condition exists on all three of the side seal strips 24x, y and z.

It is also apparent from FIG. 29 that the lengths of the paths of points A and E along curves 3A and 3E, respectively, are greater than the lengths of the paths of points B, C and D, and that the lengths of the paths of points B and D along curves 3B and 3D, respectively, are greater than the length of the path of point C along curve 3C. Consequently, the sealing strip adjacent the ends near points A and E is subjected to a greater amount of wear than the sealing strips near the center at point C, and there is a greater tendency for leakage to occur near the apex portions of the rotor through each side seal than at the midpoint thereof.

Furthermore, as illustrated in FIG. 31, the transverse components of friction force acting on the arcuate sealing strip tend to cause the sealing strip to pivot about the midpoint C, which at times during each revolution, tends to cause the ends of the sealing strip 24y adjacent the apex portions to sag or more out of engagement with the cavity end wall 7 which would produce a clearance indicated at e (exaggerated).

FIGS. 28 through 31 thus diagrammatically illustrate that the forces acting on the sealing strip 24b make it extremely difficult to maintain a uniform sealing pressure along the length of the side seals of such rotary engines.

In accordance with the present invention, interengageable force transmitting means in the form of a series of complementary cam elements is provided on the side sealing strip and one side wall of the groove in which it is received. In the embodiment of FIGS. 2 through 5, the cam elements on the sealing strip are in the form of a series of wedge-shaped teeth 46 projecting outwardly from the upper portion of the side surface 27 of the sealing strip 24. The cam elements on the rotor are in the form of a series of complementary recesses formed in the upper portion of the side wall 28 of groove 26 and extending along the length of the groove. Each tooth 46 is received in a recess 48.

Each of the teeth 46 includes a top portion 56 extending outwardly from the outer edge portion 25 of the sealing strip, and a tip portion 54 spaced from the side surface 27. Flanks 50 and 52 converge downwardly from the top portion 56 of the tooth and converge outwardly from the side surface 27 of the sealing strip to the tip 54. Thus, the flanks 50 and 52 lie in diverging planes that intersect at the tip 54, and the tooth is of substantially triangular configuration in cross-section.

Each of the recesses 48 includes planar, triangular side surfaces 58 and 60 which diverge from an apex portion 62 to the side wall 28 of the groove. The apex portion 62 defines a common base for the triangular portions 58 and 60.

Figure 4:
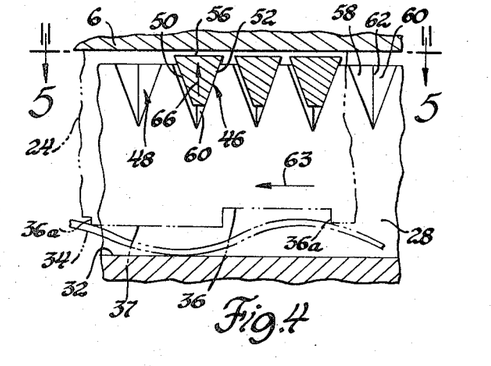
FIG. 4 is a sectional view taken on lines 4—4 of FIG. 3.

With reference to FIG. 4, the sinuous spring 34 seated on the bottom wall 32 of the groove 26 resiliently supports the sealing strip 24 to urge the sealing strip axially outwardly of the groove to apply sealing pressure between the outer edge portion 25 and the end wall surface 7. Additionally, the spring 34 is associated with the notches 36 of the sealing strip 24 in such a manner that the teeth 46 are urged toward the right as viewed in FIG. 4 so that the flank portion 52 of each tooth engages the side surface 60 of its respective recess. The crest of the sinuous spring 34 is partially received in the notch 36 but is out of alignment with the notch so that the crest is somewhat to the right of the center of the notch 36 as shown in FIG. 4. Consequently, the spring engages the corner 36a of each notch just below the crest to thereby urge the sealing strip toward the right in FIG. 4 to maintain the flanks 52 in engagement with the respective side surfaces 60. The configuration of the flanks 52 and side surfaces 60 are such that when the flank 52 is urged into engagement with the side surface 60, reaction forces are produced on the sealing strip in the directions of arrow 66 and 68 (FIG. 3) to respectively urge the sealing strip axially toward the end wall surface 7 and toward the sealing wall 30.

Figure 5:
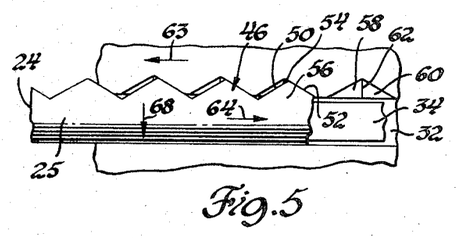
FIG. 5 is a view taken along lines 5—5 of FIG. 4.

With the rotor 10 rotating in the direction of the arrow 63, the friction forces on the surface of the outer edge portion 25 of the sealing strip 24 will have a component in the direction of arrow 64 in FIG. 5 which will also urge the sealing strip 24 toward the right as viewed in FIGS. 4 and 5 to increase the pressure between flanks 52 and side surfaces 60. The friction force component 64 acts on the contact point 25' on the outer portion 24 of sealing strip 24 in a direction opposite to the direction of rotation and thus causes the flanks 52 and side surfaces 60 to produce a reaction force in the direction of the force vector 67 (FIG. 3) having axial and transverse components 66 and 68, respectively, to increase the sealing pressure between the side surface 29 and the sealing wall 30 as well as between the outer portion 25 and the end wall surface 7.

Since the friction force component 64 urges the sealing strip in a direction to maintain pressure between the flank 52 and side surface 60 of the teeth in the respective recesses, any pressure or forces tending to retract the sealing strip 24 axially into the groove 26 is controllably resisted by the engagement between the blank 52 and side surface 60 since the side surface 60 lies in a plane that controllably resists axial movement of the sealing strip into the groove 26. Similarly, any forces tending to urge the sealing strip 24 toward the right in FIG. 3 to disengage it from the sealing wall 30 is resisted by the engagement of the teeth 46 with the respective recesses since the side surface 60 lies in a plane that controllably resists movement of the sealing strip 24 away from the sealing wall 30. The friction force components 64 thus produce reaction components through the force transmitting means 46 to urge the sealing strip along its entire length into engagement with the sealing wall 30 and the end wall surface 7. The engagement of the flanks 52 with the surfaces 60 will cam the teeth axially outwardly relative to the end face 14 in the direction of arrow 66 and transversely toward the sealing wall 30 in the direction of arrow 68. Hence, the friction forces on the surfaces 25 are harnessed to produce reaction forces that augment the pressure of the sealing strip 24 on the sealing surfaces 30 and 7.

The direction of the force vector 67 in FIG. 3 is determined by the angle of inclination of the cooperating surfaces 52, 60 with respect to the direction of the axis of rotation as well as the angle of inclination of the surfaces 52, 60 with respect to the surfaces of the side walls of the groove. The proportion of the reaction force 67 that resolves into axial and transverse components 66 and 68, respectively, can thus be predetermined by selection of the angulation of the surfaces 52, 60. The proportions of the force 67 to be resolved into axial and transverse components can also be predetermined in the same manner with the embodiments described below in connection with FIGS. 6 through 19.

The embodiment of FIGS. 1 through 5 thus illustrate a sealing assembly comprising a first seal supporting member 10 having an end face 14; a groove 26 formed in the end face 14; a sealing strip 24 received in the groove 26 and outer portion 25 of which projects axially from the groove 26 and is adapted to engage the surface 7 of a second member 6 spaced from the end face 14 and movable with respect thereto; and interengageable force transmitting means 46, 48 on the sealing strip 24 and seal supporting member 10 operable in response to friction forces on the outer portion 25 to apply transverse and axial reaction forces on the sealing strip 24 in directions indicated by arrows 68 and 66, respectively, to simultaneously urge the sealing strip 24 into sealing engagement with one side wall 30 of the groove 26 and to project further axially outwardly from the groove.

In all embodiments described hereafter, parts identical to the corresponding parts in the previously described embodiment of FIGS. 2 through 5 are identified by the same reference numeral. Parts corresponding to previously described parts but having modified structure are generally identified by the same reference numeral followed by a subscript letter.

Figures 6, 7, 8:
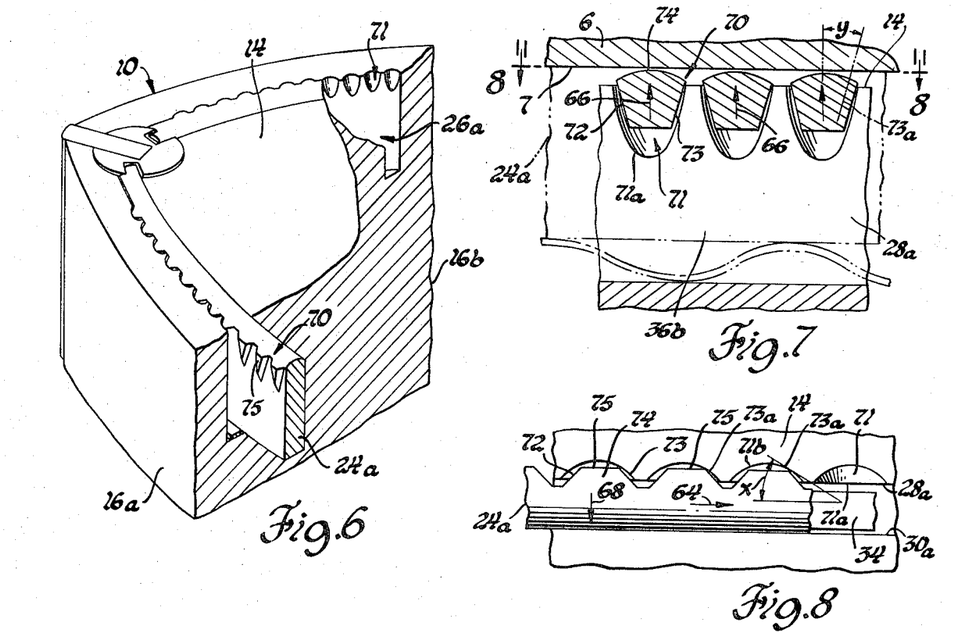
FIG. 6 is a view similar to FIG. 2 illustrating another form of the invention.
FIG. 7 is a view similar to FIG. 4 of the embodiment of FIG. 6.
FIG. 8 is a view similar to FIG. 5 taken on lines 8—8 of FIG. 7.

FIGS. 6 through 8 illustrate the invention in another form wherein the rotor 10 is provided with a sealing strip 24a having the same configuration as the sealing strip 24 of the embodiment of FIGS. 2 through 5 except that the force transmitting means between the sealing strip 24a and rotor 10 are in the form of complementary cam elements having different configurations from the corresponding elements in the previously described embodiment. In FIGS. 6 through 8, the sealing strip 24a is provided with a series of wedge-shaped teeth 70 which are received in recesses 71 of the side wall 28a of the groove. The recesses 71 are in the form of scallops or pockets each having a curved surface. Each of the recesses 71 includes a peripheral edge 71a on the side wall 28 of the groove 26a that curves downwardly from the end face 14, and a peripheral edge 71b that curves outwardly from the side wall 28a. The peripheral edges 71a and 71b are joined by the curved surface of the recess. Each of the teeth 70 are formed with flanks 72 and 73 which converge downwardly toward each other as viewed in FIG. 7 from the top portion 74 of the tooth and diverge outwardly with respect to each other from the side edges of the flat tip 75 of the respective teeth. The top portion 74 extends outwardly from the surface of the outer edge of the sealing strip 24a.

As in the previously described embodiment, the lower edge of the sealing strip 24a may be provided with notches 36b so that the spring 34 will urge the sealing strip 24a toward the right as viewed in FIG. 7 to bring the teeth 70 into engagement with the surface of the recess 71. Additionally, the friction force component 64 (FIG. 8) will urge the sealing strip 24a toward the right relative to the rotor 10. Consequently, each tooth 70 will tend to engage the surface of the respective recess 71 along the corner between the tip 75 and the flank 73, the point of contact being indicated in FIG. 8 at 73a. Initially, manufacturing tolerances will be such that there will very likely be a point contact between some of the teeth 70 and the recesses 71 and possibly some of the teeth will not initially engage the surface of their respective recess. However, during operation of the engine, the tooth will tend to wear to conform with the surface of the recess and will eventually establish a line contact between the corner of the tooth and the surface of the recess. As operation of the engine progresses, there will occur mutual wear of the teeth 70 and surfaces of the recesses 71 at the contacting surfaces along the line contacts thus providing contacts of substantial areas created by the wear. Such wear will progress in the direction of the side wall 28a because of the urging of the friction force in the direction of arrow 64 and will eventually progress to the point where all of the teeth are engaged with the respective recesses so that reaction forces are produced uniformly throughout the length of the sealing strip 24a.

The pressure produced by the friction force component 64 between the teeth 70 and recesses 71 produces axial and transverse components of force as indicated by the arrows 66 and 68 due to the configuration of the surface of the recess 71 engaged by the tooth 70. Furthermore, the engagement of the corner of the tooth with the surface of the recess increases the resistance of the sealing strip to axial movement away from the end wall surface 7 and transverse movement away from the sealing wall 30. This resistance increases as the contact point 73a moves axially toward the end wall surface 7 and transversely toward the sealing wall 30a. Such movement along the curved surface 71 increases the tangential angles in both the axial and transverse directions between the transverse and axial forces to accelerate the increase in resistance to axial retraction of the sealing strip 24a into the groove or transverse movement of the sealing strip 24a away from the sealing wall 30a. The tangential angle in the transverse direction is illustrated at X in FIG. 8. As the contact point 73a moves outwardly or toward the surface 28a in FIG. 8, the angle X increases to provide increased resistance to movement of the sealing strip 24a away from the sealing wall 30a. The tangential angle of resistance to axial movement is indicated at Y in FIG. 7. The angle Y increases as the point or line of contact between the tooth and the surface of the recess moves upwardly in FIG. 7 toward the end wall surface 7. This type of action is also discussed in the prior U.S. Pat. No. 3,334,715 in connection with interlocked tooth members of transmissions and the like.

FIGS. 6 through 8 thus disclose a sealing assembly comprising a first seal supporting member 10 having an end face 14; a groove 26a formed in the end face 14; a sealing strip 24a received in the groove 26a and outer portion 25 of which projects axially from the groove and is adapted to engage a surface 7 of a second member 6 spaced from the end face 14 and movable with respect thereto; and interengageable force transmitting means 70, 71 on the sealing strip 24a and seal supporting member 10 operable in response to friction forces on the outer portion 25 to apply transverse and axial reaction forces on the sealing strip 24a in directions indicated by arrows 68 and 66, respectively, to simultaneously urge the sealing strip 24a into sealing engagement with one side wall 30a of the groove 26a and to project further axially outwardly from the groove 26a.

In both embodiments, and in all embodiments described herein, the groove for the side seal can be formed directly into the rotor. Alternatively, as illustrated in FIG. 3, the groove for the side seal can be formed in a cartridge (illustrated in phantom lines in FIG. 3) that can be inserted into a complementary groove into the rotor. Consequently, the sealing assembly can be installed on the rotor as a package.

FIGS. 9 through 19 illustrate several embodiments of the invention wherein inclined teeth projecting from the sealing strip engage inclined recesses or serrations on the side wall of the groove.

In FIGS. 9 through 12, a sealing strip 24b is formed with a series of inclined teeth 77 which are engaged with complementary recesses or serrations 78 formed on the side wall 28b of the groove 26b. The teeth 77 each include flanks 79 and 80 which diverge from the outer tip 82 of the tooth to the side surface of the sealing strip. The flanks 79 and 80 depend from a triangular top portion 81 of the tooth 77 and lie in diverging planes that intersect at the tip 82 of the tooth. Each of the recesses 78 include side surfaces 83 and 84 (FIG. 11) which diverge from an apex portion 85 recessed from the side wall of the groove.

The side wall of the groove in which the serrations 78 are formed is recessed to define a shoulder 86 spaced beneath the teeth and recesses. A pocket is thus formed below the teeth and recesses for the accumulation of pressure from the working chambers of the engine, which accumulated pressure acts against the side surface 27b of the sealing strip to urge the sealing strip toward the sealing wall 30b and thus increase the transfer of sealing pressure. The accumulated pressure may also seep between any clearance between the side wall 28b and the sealing strip to exert pressure on the lower edge of the sealing strip in the direction of arrow 66 in FIG. 10.

Figure 12:
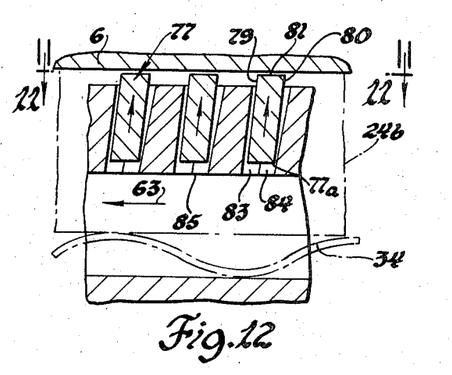
FIG. 12 is a sectional view taken on lines 12—12 of FIG. 10.

As shown in FIG. 12, manufacturing errors may be such that the flanks 80 of some or all of the teeth 77 may not be in parallel relationship with the surfaces 84 of the respective recesses 78. This condition is shown in exaggerated form in FIG. 12 wherein the lower edge of the blank 80 engages surface 84 with substantially point or line contact as illustrated by reference numeral 77a in response to the friction force component in a direction of arrow 64 (FIG. 5). The engagement of a tooth 77 with the surface 84 of a recess at the point 77a produces a reaction force substantially in the direction of arrow 67 (FIG. 10) having a transverse component in the direction of arrow 68 and an axial component in the direction of arrow 66. The direction of the resultant force vector 67 is a function of the angle of surfaces 80 and 84 both in a transverse and axial direction. Consequently, the magnitude of the transverse component in the direction of arrow 68 in proportion to the magnitude of the axial component in the direction of arrow 66 is determined by the angle of inclination of the apex portion 85 in an axial direction as well as the angle of inclination of the surface 84 with respect to the side surface of the groove.

Figure 13:
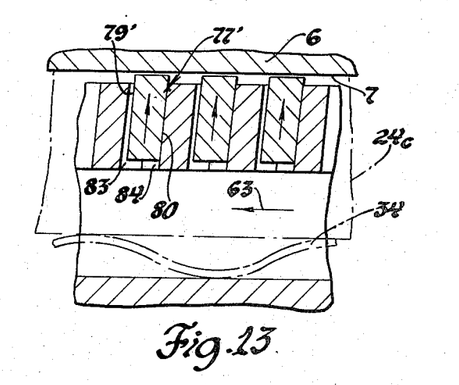
FIGS. 13 and 14 are views similar to FIG. 12 showing modifications of the construction shown in FIG. 12.

FIG. 13 illustrates the condition wherein teeth identical to the teeth 77 of FIG. 12 are in surface to surface contact with the respective recesses. In FIG. 13, the sealing strip is designated by reference numeral 24c to distinguish it from the sealing strip 24b of FIG. 12. The teeth are indicated by reference numeral 77', and teeth 77' have flanks 79' and 80'. The teeth 77' in FIG. 13 are identical to the teeth 77 of FIG. 12 except that the flanks 80' are in surface to surface contact with surface 84 when the sealing strip 24c shifts to the right in FIG. 13 relative to the rotor in response to the friction component of force as indicated by arrow 64 in FIG. 11. As in FIG. 12, the inclination of the surface 84 in both the axial and transverse directions produces a reaction force in the direction of arrow 67 in FIG. 12 having axial and transverse components 66 and 68.

Figure 14:
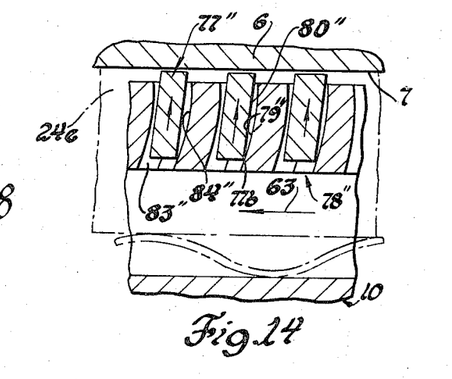

FIG. 14 illustrates a further modification wherein the surfaces of the recesses 78'' are curved such that the flanks 80'' of the teeth 77'' engage a concave surface 84'' when the rotor rotates in the direction of arrow 63 to produce friction forces in the opposite direction on the sealing strip 24e. The lower edge of the flanks 80'' will engage the concave surface 84'' as indicated by reference numeral 77b. The friction forces will tend to move the sealing strip 24e toward the right in FIG. 14, and will tend to move the contact point 77b at each tooth toward the midpoint of the arcuate surface 84''', the approximate position of the midpoint being indicated by reference numeral 79''. The tendency of the contact point 77b to move toward the midpoint 79'', of course, produces a force generally in the direction of arrow 67 in FIG. 10 having the transverse and axial component of force 68 and 66, respectively. The line contact between the lower edge of the surface 80'' and the arcuate surface 84'' at 77b resists downward axial movement of the sealing strip 24e.

Figure 15:
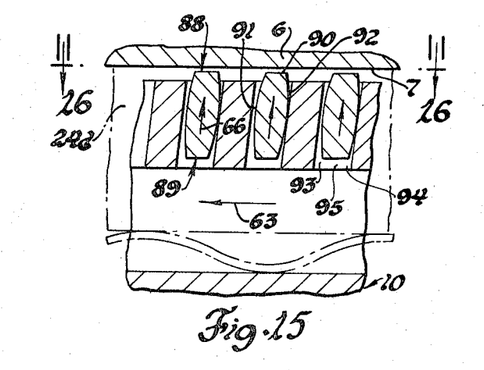
FIG. 15 is a view similar to FIG. 12 showing another form of the invention.
Figure 16:
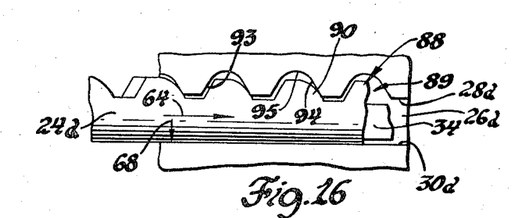
FIG. 16 is a view taken on lines 16—16 of FIG. 15.

FIGS. 15 and 16 illustrate an embodiment in which a sealing strip 24d is formed with outwardly projecting teeth 88 having outwardly curved or convex flanks 91 and 92 depending from the periphery of the top portion 90 of the tooth. Each tooth 88 is received in a recess 89 formed in the side wall of the groove 26d opposite the sealing wall 30d. Each recess 89 is formed with a curved surface 95 recessed inwardly from the side wall 28d. The longitudinal axis of the side wall is inclined upwardly and toward the right as viewed in FIG. 15 and has a side surface 94 which is engageable by the flank 92 of the respective tooth when the sealing strip 24d is shifted toward the right by friction forces in the direction of arrow 64 (FIG. 16) relative to the rotor 10. The engagement of the flank 92 with the surface 94 produces axial and transverse components of force 66 and 68 acting on the sealing strip 24d to urge it toward engagement with the sealing wall 30d and the end wall surface 7.

FIGS. 17 and 18 disclose an embodiment wherein the force transmitting means is in the form of cam elements including flexible or resilient teeth 98 formed on the sealing strip 24f. The teeth 98 each include flanks 99 and 100 which are parallel with each other and project from the side surface of the sealing strip 24f at an angle other than a right angle such that the flank 99 defines an acute angle with the adjacent side surface of the sealing strip and the flank 100 defines an obtuse angle with the side surface of the sealing strip. The flanks 99 and 100 of each tooth 98 are also inclined with respect to the top portion 102 at an angle other than a right angle so that the flank 99 defines an obtuse angle with the top portion 102 and the flank 100 defines an acute angle with the top portion 102.

Each of the recesses 103 receives one of the teeth 98 and includes spaced side surfaces 104 and 105 and an end wall 106. Each side surface 104 is inclined outwardly from the end wall 106 at an angle greater than a right angle and is in parallel relationship with the flank 100 of the respective tooth. Consequently, the friction forces in the direction of arrow 64 on the outer portion of the sealing strip 24f cause the flank 100 to engage the respective side surfaces 104 to produce reaction forces in the direction of arrows 66 and 68. The teeth 98 are sufficiently resiliently yieldable so that in the event that manufacturing tolerances result in the flank 100 of some of the teeth being out of engagement with the respective side surfaces 104 of the recesses 103, the yieldability of the teeth 98 will result in substantially all of the teeth being engaged with the respective surfaces of the recesses so that the reaction forces are produced throughout the length of the sealing strip 24f. For example, a clearance w is shown between one of the teeth 98 and the side surface 104 of its respective recess 103 in FIG. 18. So long as this condition exists, the remaining teeth will be under a greater proportionate share of the friction force component in the direction of arrow 64. Consequently, the yieldability of the teeth 98 tends to cause the teeth that are engaged with their respective surfaces 104 to flex an amount sufficient to close the clearance w on any teeth not in engagement with the surface 104 of its respective recess. Accordingly, the transverse and axial reaction forces 68 and 66 will be applied uniformly along the length of the sealing strip 24f.

In the embodiment of FIG. 19, the sealing strip 24g is provided with teeth 108 having curved flanks 109 and 110. The flank 109 is curved inwardly or concavely and engages an inclined plane 112 at the upper portion of the side surface of the respective recess 111 in which the tooth is received. The surface 112 tends to seek the lowest point of the concave surface 109 when the sealing strip 24g is urged toward the right in FIG. 19 by the friction forces. The tendency of the curved portion 112 of the recesses to seek the lowest point of the concave surface 109 results in producing the axial and transverse force components 66 and 68. Furthermore, the location of the surface 112 near the sealing surface at the end wall 7 increases the resistance to downward axial movement of the teeth 108 so long as the surface 109 is engaged with the surface 112 because the friction force component tending to move the sealing strip 24g to the right relative to the rotor in FIG. 19 will result in the surface 112 attempting to move to the lower portion of the flank 109 and thereby urge the sealing strip 24g axially outwardly of the groove 26g toward the end wall surface 7. The surface 112 and flank 109 are also inclined transversely of the sealing strip 24g in a direction to exert a transverse force on the sealing strip 24g in the direction of arrow 68 (FIG. 17) to urge the sealing strip 24g toward the sealing wall of the groove. The teeth 108 extend at an angle from the side surface of the sealing strip 24g in the same manner that the teeth 98 in the embodiment of FIG. 17 extend at an angle from the side surface of the sealing strip 24f. Similarly, the surface engaged by the flank 109 of the recess 111 is inclined with respect to the side wall of the groove in a manner similar to the inclination of the surface 104 of the recesses 103 in the embodiments of FIGS. 17 and 18.

FIGS. 20 through 24 disclose embodiments of the invention wherein force transmitting means on the sealing strip and rotor react to the friction force components on the outer portion of the sealing strip to produce an axial component of force urging the sealing strip toward the end wall surface 7 and at the same time producing a moment tending to twist or cock the sealing strip in the groove to produce transverse components of force urging a portion of the sealing strip against the sealing wall adjacent the outer end thereof, and an axially spaced portion of the sealing strip against the wall of the groove opposite the sealing wall.

Figure 20:
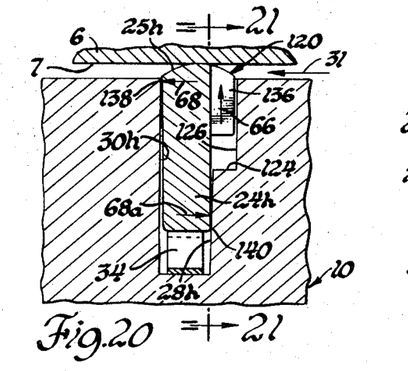
FIG. 20 is a view similar to FIGS. 3 and 10 showing another form of the invention.
Figures 21, 23:
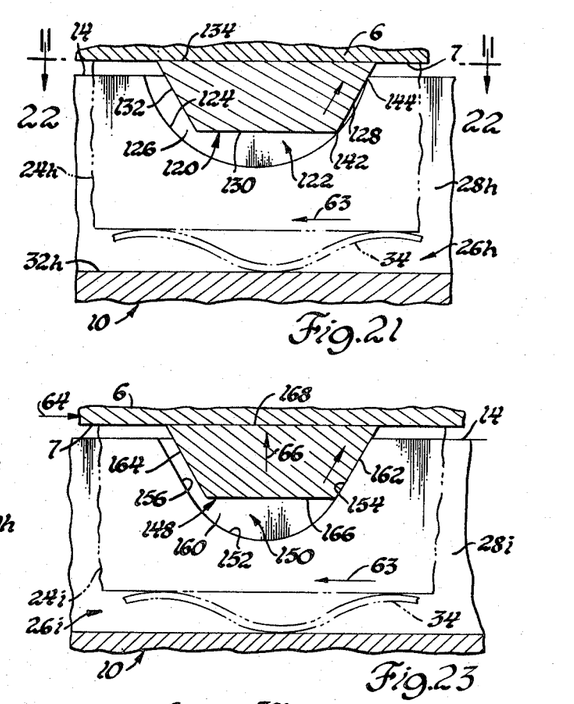
FIG. 21 is a sectional view taken on lines 21—21 of FIG. 20.
FIG. 23 is a view similar to FIG. 21 showing a modified form of the embodiment of FIG. 21.
Figure 22:
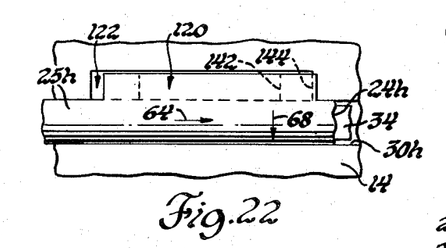
FIG. 22 is a view taken on lines 22—22 of FIG. 21.

FIGS. 20, 21 and 22 illustrate an embodiment of the invention wherein a sealing strip 24h is received in a groove 26h formed in the end face 14 of the rotor 10. The sealing strip 24h has an outer portion 25h which engages the end wall surface 7. As in the previously described embodiments, interengageable force transmitting means 120, 122 are provided on the sealing strip 24h and seal supporting member 10, the force transmitting means being operable in response to friction forces on the sealing strip in the direction of arrow 64 in FIG. 22 to apply a transverse and axial reaction forces on the sealing strip in directions to simultaneously urge the sealing strip 24h into sealing engagement with the sealing wall 30h of the groove 26h and to project axially outwardly from the groove into sealing engagement with the end wall surface 7.

The interengageable force transmitting means are in the form of teeth 120 projecting from the sealing strip 24h and recesses 122 formed in the side wall 28h of the groove 26h. The recess 122 has a side wall 126 which is parallel to the side wall 28h, and a circular or arcuate end wall 124 extending transversely to the side wall 28h and 126 and forming a cam surface for the tooth 120. The tooth 120, as viewed in FIG. 21, is of trapezoidal configuration and includes leading and trailing flanks 128 and 132, respectively, extending downwardly and inwardly from a top portion 134 to a bottom portion 130. The tooth 120 has an outer tip portion 136 which is disposed in opposed relationship with the side wall 126 of the recess 122.

With the rotor 10 rotating in the direction of arrow 63 (FIG. 21), the friction forces between the outer portion 25h of the sealing strip will have components in the direction of arrow 64 (FIG. 22) which will urge the sealing strip toward the right with respect to the rotor 10 as viewed in FIG. 21 to cause the flank 128 of the tooth 120 to engage the arcuate surface 124 at points 142 and 144 (FIGS. 21 and 22). The friction forces 64 will tend to cause the lower edge of the flank 128 at contact point 142 to move upwardly along the arcuate surface 124 to thereby produce an axial force on the tooth 120 in the direction of arrow 66 (FIG. 20). Since the tooth 120 projects from one side of the sealing strip 24h, the axial component of force 66 will tend to rotate or twist the sealing strip 24h in a counterclockwise direction as viewed in FIG. 20 thereby imposing transverse components of force in the direction of arrows 68 and 68a on the sealing strip. The twisting action will urge the sealing strip to contact the sealing wall 30h at approximately point 138 and to contact the side wall 38h at contact point 140 spaced axially beneath the contact point 138. The pressure at points 138 and 140 on the sealing strip 24h thereby enhances the sealing in the transverse direction and increases the sealing pressure at contact point 138 between the sealing strip and the sealing wall 30h. The engagement of the flank 128 with the arcuate surface 124 at contact points 142 and 144 provide increased resistance to movement of the sealing strip 24h axially away from the end wall surface 7 as the contact point 142 moves axially upwardly in FIG. 21. With wear on the outer portion of the sealing strip, the contact point 142 will move upwardly in FIG. 21 to provide accelerated increased resistance to axial movement of the sealing strip 24h away from the end wall surface 7. This type of action is similar to that discussed in the prior U.S. Pat. No. 3,334,715 of the inventor.

FIG. 23 shows a modification of the construction shown in FIGS. 20 through 22. In FIG. 23, a sealing strip 24i is received in a groove 26i formed in the end face 14 of the rotor 10. The force transmitting means are in the form of teeth 148 on the sealing strip and complementary recesses 150 formed in the side wall 28i of the groove 26i. The recess 150 in FIG. 23 includes a side surface 160 parallel to the side wall 28i and an end surface including an arcuate lower portion 152 and diverging straight portions 154 and 156 inclined outwardly to the end face 14. The tooth 148 has a configuration substantially identical to the configuration of the tooth 120 in the embodiment of FIGS. 20 through 22 and has leading and trailing flanks 162 and 164, respectively, converging downwardly from the top portion 168 of the tooth toward a bottom portion 166. The flank 162 is substantially parallel to the inclined surface 154 of the recess 150. Consequently, when the friction forces in the direction of arrow 64 produced by rotation of the rotor in the direction of arrow 63 urge the flank 162 into engagement with the surface 154, the tooth 148 is urged upwardly by the ramp 154. In the embodiment of FIG. 23, there is substantially a surface to surface contact between the flank 152 and the surface 154 of the recess to produce a ramp effect. The vertical component of force in the direction of arrow 66 also produces the twisting action on the sealing strip 28i in the same manner as in the embodiment of FIGS. 20 through 22.

Figure 24:
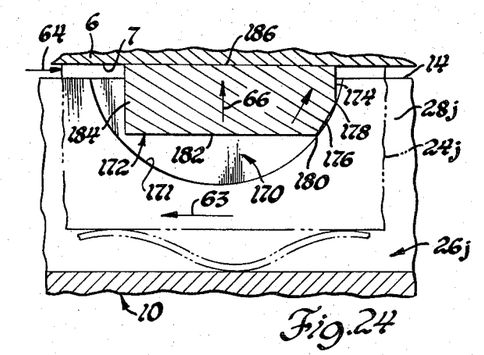
FIG. 24 is a view similar to FIG. 21 showing still another modified form of the embodiment of FIG. 21.

FIG. 24 illustrates another modification of the construction shown in FIGS. 20 through 22 wherein the sealing strip 24j is received in a groove 26j formed in the end face 14 of the rotor 10. The force transmitting means are in the form of teeth 172 projecting from the sealing strip 24j received in recesses 170 formed in the side wall 28j of the groove. The recess 170 is of identical configuration to the recess 122 in FIG. 21 and includes an arcuate surface 171. The tooth 172 in FIG. 24 includes leading and trailing flanks 174 and 184 extending substantially in parallel relationship from the top portion 186, and a bottom portion 182 parallel to the top portion 186. The leading flank 174 also includes an inclined or chamfered portion 176 having edge portions 178 and 180. The edge portions 178 and 180 engage the arcuate surface 171 in response to the friction force components in the direction of arrow 64 produced by rotation of the rotor in the direction of arrow 63. The engagement of the edge portions 178 and 180 with the arcuate surface 171 produces an axial component of force in the direction of arrow 66 urging the sealing strip 24j toward the end wall surface 7. Since the tooth 172 projects from one side of the sealing strip 24j as in the embodiment of FIG. 20, a twisting force is produced on the sealing strip 24j to produce transverse components of force corresponding to the components 68 and 68a of FIG. 20.

In the embodiment of FIG. 24, the edge portions 178 and 180 will tend to move up the arcuate surface 171 and provide accelerated resistance to axial movement of the sealing strip 24j away from the end wall surface 7. Furthermore, the substantially line contact between the edge portions 178, 180 and the arcuate surface 171 will, during the operation of the engine, produce wear at the contact points, which wear will progress generally in the direction of the end face 14 to further increase the tendency of the sealing strip to remain in sealing engagement with the end wall surface 7. As pointed out previously, as the edge portions 178 and 180 move upwardly along the arcuate surface 171, the resistance to axial movement in a direction opposite to arrow 66 in FIG. 24 increases.

In FIGS. 20 through 24, notches 36b of FIG. 7 from the bottom edge of the sealing strip are omitted. However, it should be understood that this feature can be included with all embodiments to cooperate with the sinuous spring 34 to urge the sealing strip teeth into engagement with the cam surfaces of the respective recesses. Moreover, this feature can be omitted from all embodiments since the friction forces in the direction of arrow 64 will always urge the teeth into engagement with the surface of the recesses. However, this feature enhances the control of the sealing pressure uniformly along the length of the sealing strip.

The number and spacing of the teeth and recesses in all embodiments may be varied as desired. However, it is obvious that the greater number of teeth and recesses tends to increase the uniformity of sealing pressure along the circumferential length of the sealing strip 24. The location of the teeth may also be determined by the location along the circumferential length of the sealing strip of specific leakage porblems. For example, FIG. 31 illustrates a problem that can occur when the friction forces are in a direction tending to pivot the sealing strip 24y about the midpoint C in a direction to cause the ends of the sealing strip to move downwardly with respect to the midpoint C. Occurrence of this condition can produce a clearance e between the ends of the sealing strip 24y and the end wall surface 7, the clearance e being greatly exaggerated for purposes of illustration in FIG. 31. It is, therefore, important to locate the cooperating teeth and recesses near the ends of the sealing strip to counteract the condition illustrated in FIG. 31.

Figure 9:
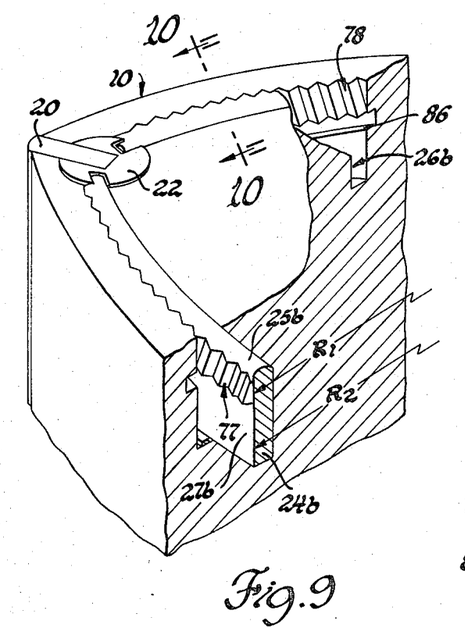
FIG. 9 is a view similar to FIGS. 2 and 6 illustrating another form of the invention.
Figure 10:
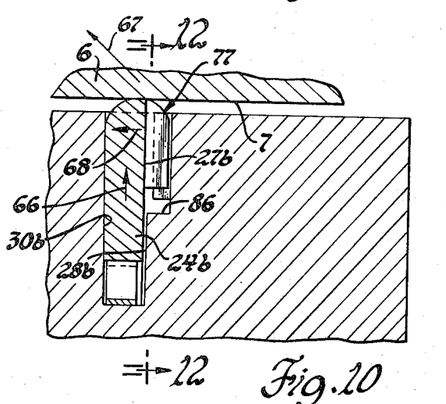
FIG. 10 is a sectional view taken approximately on lines 10—10 of FIG. 9.
Figure 11:
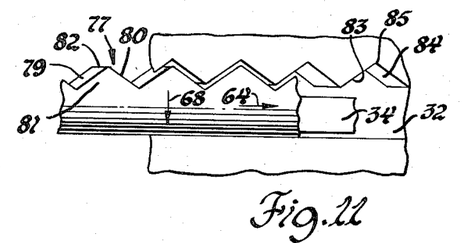
FIG. 11 is a view taken on lines 11—11 of FIG. 12.

It is also preferably in connection with the embodiment of FIG. 9 that the roots of the teeth 77 be located at the side surface 27b of the sealing strip 24b so that the sealing strip has uniform thickness from the outer portion 25b to the bottom edge of the strip so that the radius R1 to the root of the teeth 77 is the same as the radius R2 in FIG. 9 to eliminate any tendency of the bottom edge to buckle inwardly when the sealing strip 24b is formed into its arcuate shape.

Again referring to FIG. 2, clearance is provided between the end portions 23 of the sealing strip 24 and the walls of the slot of the intermediate coupling seal 22 to permit free movement of the coupling seal 22 relative to the side seals 24. The clearance is adequate to prevent the longitudinal shifting of the side seal 24 in their respective grooves 26 and to permit axial movement of the coupling seal 22 relative to the side seals 24. However, the clearance around the three sides of the end portion 23 provides a baffle effect having high resistance to leakage of fluid around the end portion 23.

Figure 25:
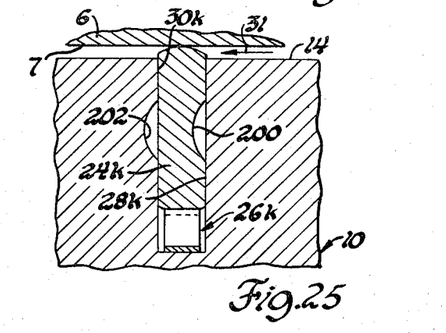
FIG. 25 is a view similar to FIG. 20 showing another form of the invention.
Figure 26:
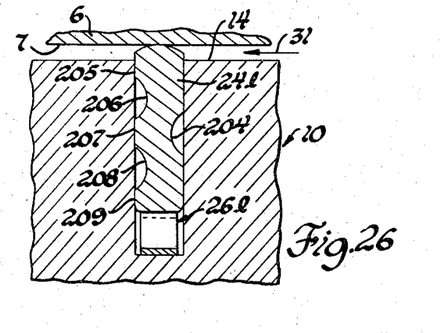
FIG. 26 is a view similar to FIG. 25 showing still another form of the invention.
Figure 27:
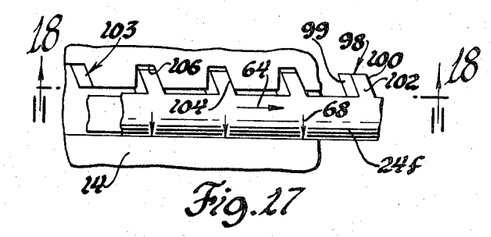
FIG. 27 is another view similar to FIG. 25 showing still another form of the invention.

Another problem that may occur during the life of an engine is that carbon and other foreign matter may accumulate in the side seal grooves and cause the side seals to stick in the grooves and thereby fail to seat against the end wall surface 7. FIGS. 25, 26 and 27 illustrate constructions that will alleviate this problem, and which constructions can be used in conjunction with the previously described embodiments, or which are useful with other forms of side seals not utilizing the force transmitting means disclosed in the previously described embodiments.

In FIG. 25, a side seal strip 24k is received in a groove 26k formed in the end face 14 of the rotor 10. As in the previously described embodiments, the arrow 31 represents the direction of high pressure from the working chambers of the engine, and the high pressure in the direction of arrow 31 tends to urge the sealing strip 24k into sealing engagement with the sealing wall 30k by seeping between the sealing strip 24k and the side wall 28k. The sealing strip must be able to move freely axially in the groove 26k to accommodate wear caused by the engagement of the outer portion thereof with the end wall surface 7. In FIG. 25, a pocket 200 having an arcuate cross section and extending throughout the length of the sealing strip 24k is formed on the pressure side of the sealing strip, and a similar pocket 202 is formed in the sealing wall 30 of the groove 26k and extends throughout the length of the groove. The pockets 200 and 202 provide a receptacle for carbon particles and other foreign matter which might otherwise tend to accumulate on the side walls of the groove and the side surfaces of the sealing strip. The pocket 200 also provides greater arcuate rigidity to the sealing strip 24k.

In the embodiment of FIG. 26, pockets 204, 206 and 208 are formed on the sealing strip, pocket 204 being formed on the pressure side of the sealing strip and pockets 206 and 208 being formed on the sealing side. The pockets 204, 206 and 208 are each of arcuate cross section and extend throughout the length of the sealing strip 241. By providing two axially spaced pockets on the sealing side, the bearing surface against the sealing wall is provided by the areas 205, 207 and 209. The reduction of the bearing area provides a higher unit loading on the sealing wall to enhance the sealing and also improves the cleaning action of the surface of the sealing wall and side surface of the sealing strip when the sealing strip moves axially in the groove. The higher unit loading on the sealing wall enhances the tendency of the sealing strip to scrape foreign particles from the sealing wall, which particles can be collected in the receptacles provided by the pockets 206 and 208. As in the previously described embodiment of FIG. 25, the provision of the elongated pockets 204, 206 and 208 extending throughout the length of the strip 241 increases the arcuate rigidity of the sealing strip.

In FIG. 27, pockets 210 and 212 are formed in the opposite side walls of the groove to serve as receptacles for the carbon particles and other foreign material. The pockets 210 and 212 extend throughout the length of the grooves, and there is a consequent increase in the unit loading between the surface of the seal 24m and the sealing wall of the groove.

With the various disclosed constructions, it is possible not only to adequately contain the pressures on the working chamber side of the side seals, but to govern and closely control the amount of leak-by past the side seals such as, for example by selection of the angles of inclination of the cooperating cam elements. Proper control of the pressures in the working chambers lends to higher compression engines, and this advantage is available with both gasoline or spark ignition engines, and diesel or compression ignition engines.

Another advantage of the invention is that the side wall of the groove opposite the sealing wall is not relied upon for a sealing function and hence does not require as accurate a surface finish as the sealing wall.

In all of the illustrated embodiments, the force transmitting means is in the form of cooperating cam elements formed on the upper portion of the side surface of the side sealing strip and the upper edge of the side wall of the groove on the working chamber or high pressure side of the sealing strip, the sealing wall of the groove being defined by the side wall of the groove on the opposite side of the sealing strip from the working chamber. However, it is within the scope of the invention for the teeth and recesses to be located on the opposite side surface and side wall of the sealing strip and groove, respectively, and for the teeth and recesses to be located at positions on the side surface of the sealing strip and side wall of the groove other than at the upper edges thereof, and for the sealing wall of the groove to be defined on the side wall adjacent to the working chambers of the engine.

In all embodiments of FIGS. 2 through 19, frictional drag forces 64 acting on the line of contact between the sealing strip and the cavity end wall 7 counter to the direction of rotation (arrow 63) are utilized to produce reaction forces 67 to control the sealing pressure.

While several specific embodiments of the invention are illustrated in the accompanying drawings and described in the foregoing specification, it should be understood that the invention is not limited to the exact construction shown. Alterations and modifications in the structure, all falling within the scope and spirit of the invention, will be apparent to those skilled in the art.

The embodiments of the invention in which an exclusive property or privilege is claimed are defined as follows:

1. A rotary device for eccentric rotor machines comprising: a rotor having an end face lying in a plane substantially normal to the axis of rotation of said rotor; an elongated groove formed in said end face, said groove having a pair of spaced side walls; an elongated sealing strip received in said groove, said sealing strip having an outer edge and a pair of spaced side surfaces; biasing means engaged between said rotor and sealing strip biasing said outer edge to project from said groove; and interengageable force transmitting means on said sealing strip and rotor operable in response to longitudinal forces on said outer edge to apply transverse and axial forces on said sealing strip in a direction to simultaneously urge one of said surfaces into sealing engagement with one side wall of said groove and said outer edge outwardly of said groove.

2. A deviced as claimed in claim 1 wherein said force transmitting means comprises a series of complementary cam elements formed on the other side surface of said strip and the other side wall of said groove along the lengths thereof.

3. A device as claimed in claim 2 wherein said cam elements comprise a series of teeth projecting from said other side surface of said sealing strip and a series of recesses formed in said other side wall of said groove, each of said recesses receiving one of said teeth.

4. A device as claimed in claim 2 wherein said cam elements comprise a series of inclined teeth projecting from said other side surface of said sealing strip and a series of complementary inclined recesses formed in said other side wall of said groove, each of said recesses receiving one of said teeth.

5. A rotor for a rotary machine comprising: a generally triangular rotary body having three apex portions and convex side walls extending therebetween with a pair of end faces extending between the opposite edges of the side walls normal to the rotary axis; an elongated groove formed in at least one of said end faces, said groove having a segment extending alongside each of said convex side walls; said groove having a pair of spaced side walls, and a series of recesses formed in one of said side walls along the length thereof, each of said recesses having a surface having a configuration adapted to cam a tooth having a complementary cam surface engaged therewith transversely toward the other side wall and axially outwardly of said groove.

6. A side seal member for the rotor of a rotary engine comprising: an elongated sealing strip having an outer sealing edge and a pair of spaced side surfaces extending therefrom in an axial direction with respect to the rotary axis of a rotor in which the seal is adapted to be mounted, and a series of teeth projecting outwardly from one of said side surfaces along the length thereof, each of said teeth having a flank portion with a surface configuration operable to cam the sealing strip transversely and axially when engaged by a complementary surface on such rotor.

7. A rotor for a rotary machine comprising: a generally triangular shaped rotary body having three apex portions and side walls extending therebetween with a pair of spaced end faces extending between opposite edges of said side walls, said end faces being normal to the rotary axis of said body; an elongated groove formed in at least one of said end faces along each of the side walls thereof, each of said grooves having a pair of spaced side walls in generally parallel relationship with the side walls of said body; an elongated sealing strip received in each of said grooves; each of said sealing strips having an outer edge and a pair of spaced side surfaces extending from said outer edge, biasing means engaged between said rotary body and sealing strip biasing said outer edge to project from said groove; and interengageable force transmitting means on said sealing strip and rotary body operable in response to longitudinal forces on said outer edge to apply transverse and axial forces on said sealing strip in a direction to simultaneously urge one of said side surfaces into sealing engagement with one side wall of said groove and said outer edge outwardly of said groove.

8. A rotary machine comprising: a housing having a cavity formed therein with a pair of axially spaced end walls and a peripheral side surface extending therebetween; a rotor received in said cavity for rotation about an eccentric axis, said rotor having a pair of end faces disposed in opposed relationship with respective ones of said end walls; an elongated groove in each of said end faces; an elongated sealing strip received in each groove, each of said sealing strips having an outer edge biasing means engaged between said rotor and each of said sealing strips "biasing" the outer edge of each sealing strip to project from its respective groove into sliding engagement with the respective end wall; means for causing rotation of said rotor relative to said end walls; and interengageable force transmitting means on said sealing strip and rotor operable in response to friction forces on said outer edge to apply transverse and axial forces on said sealing strip in a direction to simultaneously urge one of said side surfaces into sealing engagement with one side wall of said groove and said outer edge toward sealing engagement with the respective end wall.

9. A device as claimed in claim 1 wherein said force transmitting means comprises complementary cam elements formed on said sealing strip and the other wall of said groove.

10. A device as claimed in claim 9 wherein said complementary cam elements comprise at least one tooth projecting from said sealing strip, and at least one recess formed in said other wall of said groove, said recess receiving said tooth.

11. A device as claimed in claim 10 wherein said tooth and recess have complementary cam surfaces engageable with each other in response to friction forces on the outer portion of said sealing strip, and operable when engaged to produce a reaction force on said sealing strip having an axial component urging said sealing strip axially outwardly of said groove and a transverse component urging said sealing strip toward said one side wall of said groove.

12. A device as claimed in claim 11 further including a spring received in said groove and engaged with said sealing strip and biasing said sealing strip to project axially from said groove, and biasing said complementary surfaces of said tooth and recess into engagement with each other.

13. A device as claimed in claim 12 wherein said spring comprises a sinuous spring received in said groove beneath said sealing strip, said sealing strip being formed with alternating notches and projections on its bottom edge, said spring engaging one corner of said notches to bias said sealing strip in a direction to bring said complementary surfaces of said tooth and recess into engagement with each other.

14. A device as claimed in claim 11 further including at least one pocket formed in said sealing strip and extending along the length thereof for collecting foreign material received in said groove.

15. A device as claimed in claim 11 wherein said complementary surface of said recess and tooth are operable when engaged to apply an axial force to said tooth and a twisting moment to said sealing strip, said twisting moment producing transverse components of force in said sealing strip in opposite directions at axially spaced locations.

16. A device as claimed in claim 11 wherein said tooth is wedge-shaped and includes a top portion, a tip portion spaced from the adjacent side surface of said sealing strip, and a pair of flanks diverging from said tip toward said adjacent side surface of said sealing strip, said flanks also diverging axially to said top portion.

17. A device as claimed in claim 16 wherein said recess includes planar, substantially triangular side surfaces diverging outwardly to said end face and diverging from an apex portion to the surface of said other side wall of said groove, said complementary cam surface being defined by one of said flanks of said tooth and one of said side surfaces of said recess.

18. A device as claimed in claim 16 wherein said recess comprises a pocket formed in said other side wall of said groove, and said tooth has a flat tip extending between said flanks, said pocket having a curved surface engageable by the corner of one of said flanks, the surface of said pocket being curved in a direction to urge said tooth axially outwardly of said groove and transversely toward said one side wall of said groove.

19. A device as claimed in claim 18 wherein said corner of said tooth engages the curved surface of said recess with a substantially line contact, and the curvature of the surface of said recess is such that increased axial and transverse movement of the line of contact between said tooth and recess respectively axially outwardly of said groove and toward said one wall progressively increases the resistance to movement of said sealing strip axially inwardly and transversely away from said one side wall of said groove.

20. A device as claimed in claim 11 wherein said tooth has an outer tip spaced from the side surface of said sealing strip and inclined axially with respect to said sealing strip and a pair of flanks diverging from said outer tip, and said recess has a pair of side surfaces diverging from an apex portion to said other side wall of said groove, one of said flanks and the adjacent one of said side surfaces of said groove defining said complementary cam surfaces.

21. A device as claimed in claim 20 wherein said one flank and side surface are in nonparallel relationship such that the lower edge of said flank only engages said side surface with substantially a line contact.

22. A device as claimed in claim 21 wherein said one flank engages said one surface with a surface to surface contact.

23. A device as claimed in claim 20 wherein said one side surface of said recess is concavely curved with respect to said one flank and through the lower edge only of said one flank engages said one surface with substantially a line contact, the concavity of said one surface being such that the line of contact is urged axially outwardly of said groove by the friction forces on said sealing strip.

24. A device as claimed in claim 11 wherein said tooth is axially inclined and has convex flanks, and said recess has a side surface engageable with one of said convex flanks and defining therewith said complementary cam surfaces.

25. A device as claimed in claim 11 wherein said tooth has parallel flanks projecting from a side surface of said sealing strip at an angle other than a right angle, said tooth having a planar top portion, said flanks depending from said top portion at an angle other than a right angle, said tooth being yieldable with respect to said sealing strip.

26. A device as claimed in claim 25 wherein said recess includes an end wall spaced inwardly from said other side wall of said groove, and a side surface inclined outwardly from said end wall in substantially parallel relationship with said flanks and being engageable by one of said flanks, said side surface and one flank defining said complementary cam surfaces.

27. A device as claimed in claim 11 wherein said recess has a side surface with an inclined plane at the edge thereof adjacent to said end face; and wherein said tooth has a concave flank engageable with said inclined surface, said inclined surface and concave flank constituting said complementary cam surfaces.

28. A device as claimed in claim 11 wherein said recess has a transverse cam surface engageable by said tooth in response to said friction forces to produce an axial component of force on said tooth urging said tooth axially outwardly, which axial component of force imposes a twisting moment on said sealing strip to produce a transverse component of force urging said sealing strip into sealing engagement with said one side wall of said groove.

29. A device as claimed in claim 28 wherein said tooth has a leading flank engageable with said cam surface, said leading flank and transverse cam surface constituting said complementary cam surfaces.

30. A device as claimed in claim 29 wherein at least a portion of said transverse cam surface is arcuate.

31. A device as claimed in claim 30 wherein at least a portion of said leading flank is inclined relative to the axis of said rotor.

32. A device as claimed in claim 31 wherein said transverse cam surface has an inclined straight portion defining a ramp, and said leading flank engages said ramp with substantially a surface to surface contact.

33. A device as claimed in claim 31 wherein said transverse cam surface is arcuate throughout and said leading flank engages said arcuate surface with substantially a line contact.

34. A device as claimed in claim 33 wherein said leading flank is axially inclined throughout and the lower edge thereof engages the arcuate cam surface with substantially a line contact, and the upper edge of said arcuate cam surface engages said leading flank at a position intermediate its ends with substantially a line contact.

35. A device as claimed in claim 33 wherein said leading flank has an upper axial portion and a lower inclined portion, and the edges of said lower inclined portion engage said arcuate surface with substantially a line contact.

36. A device as claimed in claim 1 wherein the other side wall of said groove is recessed to define a shoulder spaced from said force transmitting means on the opposite side thereof from said end face to define a pocket for the accumulation of pressure to further urge said sealing strip toward said one wall.

* * * * *